United States Patent
Ruokojarvi et al.

(10) Patent No.: US 10,429,853 B2
(45) Date of Patent: Oct. 1, 2019

(54) ZONE PASSAGE CONTROL IN WORKSITE (71) Applicant: SANDVIK MINING AND CONSTRUCTION OY, Tampere (FI)

(72) Inventors: Jarkko Ruokojarvi, Tampere (FI); Antti Lehtinen, Tampere (FI); Janne Kallio, Tampere (FI)

(73) Assignee: Sandvik Mining and Construction OY, Tampere (FI)

( * ) Notice: Subject to any disclaimer, the term of this patent is extended or adjusted under 35 U.S.C. 154(b) by 138 days.

(21) Appl. No.: 15/538,412

(22) PCT Filed: Dec. 16, 2015

(86) PCT No.: PCT/EP2015/079914
§ 371 (c)(1),
(2) Date: Jun. 21, 2017

(87) PCT Pub. No.: WO2016/107743
PCT Pub. Date: Jul. 7, 2016

(65) Prior Publication Data
US 2017/0351264 A1 Dec. 7, 2017

(30) Foreign Application Priority Data
Dec. 29, 2014 (EP) .................................... 14200373

(51) Int. Cl.
G05D 1/02 (2006.01)
F16P 3/14 (2006.01)
E21F 17/18 (2006.01)

(52) U.S. Cl.
CPC ........... G05D 1/0246 (2013.01); E21F 17/18 (2013.01); F16P 3/142 (2013.01); G05D 1/0287 (2013.01); G05D 2201/021 (2013.01)

(58) Field of Classification Search
None
See application file for complete search history.

(56) References Cited

U.S. PATENT DOCUMENTS 4,722,574 A 2/1988 Barham et al.
4,940,925 A * 7/1990 Wand .................. G05D 1/0246
318/580
(Continued)

FOREIGN PATENT DOCUMENTS

EP 2282106 A1 2/2011
WO 03/091956 A1 11/2003
(Continued)

Primary Examiner — Richard M Camby
(74) Attorney, Agent, or Firm — Corinne R. Gorski (57) ABSTRACT A system for zone passage control for a zone of an autonomously operating mobile object includes at least a set of detection units to detect at least one mobile object entering and/or exiting the zone, a set of identification units arranged to identify the mobile object entering and/or exiting the zone, and a central controller being arranged in operational connection with the set of the detection units and with the set of the identification units. An admissibility level for a mobile object to enter the zone is determined and a control signal to stop at least one autonomously operating mobile object existing in the zone is provided in response to the determined admissibility level being negative for the mobile object entered the zone.

14 Claims, 3 Drawing Sheets (56) References Cited

U.S. PATENT DOCUMENTS 5,107,946 A * 4/1992 Kamimura ............ G05D 1/027
  180/167
6,470,989 B1 10/2002 Puputti et al.

FOREIGN PATENT DOCUMENTS

WO 2004088092 A1 10/2004
WO 2011051558 A2 5/2011

* cited by examiner

FIG. 3

ZONE PASSAGE CONTROL IN WORKSITE

RELATED APPLICATION DATA

This application is a § 371 National Stage Application of PCT International Application No. PCT/EP2015/079914 filed Dec. 16, 2015 claiming priority of EP Application No. 14200373.0 filed Dec. 29, 2014.

FIELD OF THE INVENTION

The present invention relates to a zone passage control in a worksite.

BACKGROUND OF THE INVENTION

Different worksites, such as underground mines and above-ground mines, typically comprise a variety of operation zones intended to be accessed by different types of mobile work machines. Mining vehicles operating in mines may for example be autonomously operating, i.e. automated mining vehicles, which in their normal operating mode operate independently without any external control but which may be taken under external control during states of emergencies, for example. A mining vehicle may also be an unmanned, e.g. from a control room remotely controllable mining vehicle, or a manned mining vehicle, i.e. a mining vehicle operated by an operator sitting in a cabin of the mining vehicle.

An isolated operation zone is typically reserved in mines for the operation of the automated mining vehicles, into which zone an access by outsiders and outside vehicles is prevented in order to eliminate any risk of collision. The operation zone being provided with this kind of limited access may be separated from other zones in the mine by iron gates or other kind of passage control devices.

However, in order to provide an effective operation of the mine, there may appear a need to provide an access also for outsiders or outside mining vehicles into the operation zone being originally reserved only for the operation of the automated mining vehicles. In that case a safe access of the outsiders or outside vehicles into that zone must be considered.

BRIEF DESCRIPTION OF THE INVENTION

An object of the present invention is to provide a novel solution for providing zone passage control in a worksite.

The basic idea of the system for the zone passage control as disclosed is provide a safe access of any kind of mobile objects in a controlled manner into an operation zone reserved originally only for autonomously operating mobile objects. This means that also other mobile objects than only autonomously operating mobile objects are allowed to enter in the controlled manner to the same operation zone. Furthermore, the system is also provided with a safety precaution according to which the movement of at least one autonomously operating mobile object existing in the particular operation zone is stopped if any mobile object, which is not intended to enter into the same operation zone at the same time as there already is at least one autonomously operating mobile object, yet enters into the same operation zone.

The term worksite in this specification and claims is intended to include a variety of worksites, including for example different kind of excavation worksites, such as roadwork sites, railroad worksites and dam worksites, and including especially underground mines and above-ground mines.

The term mobile object in this specification and claims is intended to include all mobile objects which may have an access into an operation zone of a worksite, such as mobile work machines and human beings being at work in the worksite.

The term mobile work machine in this specification and claims is intended to include all mobile vehicles suitable to be used in the operation of different kinds of mining or construction excavation worksites, such as lorries, caterpillars, dumpers and bucket loaders or other kind of mobile vehicles which may be used in different kinds of excavation worksites. Specifically the term mobile work machine includes mining vehicles to be used in underground mines or above-ground mines, such as various mobile loading and transport machinery as well as mobile rock drilling rigs.

The term autonomously operating mobile object in this specification and claims is intended to include automated mobile work machines, which in their normal operating mode operate independently without any external control but which may be taken under external control during states of emergencies, for example.

The term non-autonomously operating mobile object in this specification and claims is intended to include both mobile work machines being controlled by an operator and human beings being at work in the worksite.

BRIEF DESCRIPTION OF THE DRAWINGS

In the following the invention will be described in greater detail by means of preferred embodiments with reference to the accompanying drawings, in which.

For the sake of clarity, the figures show some embodiments of the invention in a simplified manner. Like reference numerals identify like elements in the figures.

DETAILED DESCRIPTION OF THE INVENTION

The solution presented below is suitable for use in a zone passage control or in a safety system particularly related to mobile objects taking part in the mining, such as various mobile loading and transport machinery as well as mobile rock drilling rigs, but also human beings being at work in the mine. In the following, such mobile mining machines are referred to as mining vehicles. The scope of the specification is not restricted only to the zone passage control of mining vehicles to be illustrated below, but the features disclosed may also be applied to other types of zone passage control systems for mining vehicles. It is also to be noted that a mining vehicle may generally refer to various machinery used for rock excavation in underground mines or above-ground mines. Furthermore, the solution presented below is also suitable for use in a zone passage control or in a safety system for mobile work machines used in other kind of worksites, such as roadwork sites, railroad worksites and dam worksites.

Figure 1:
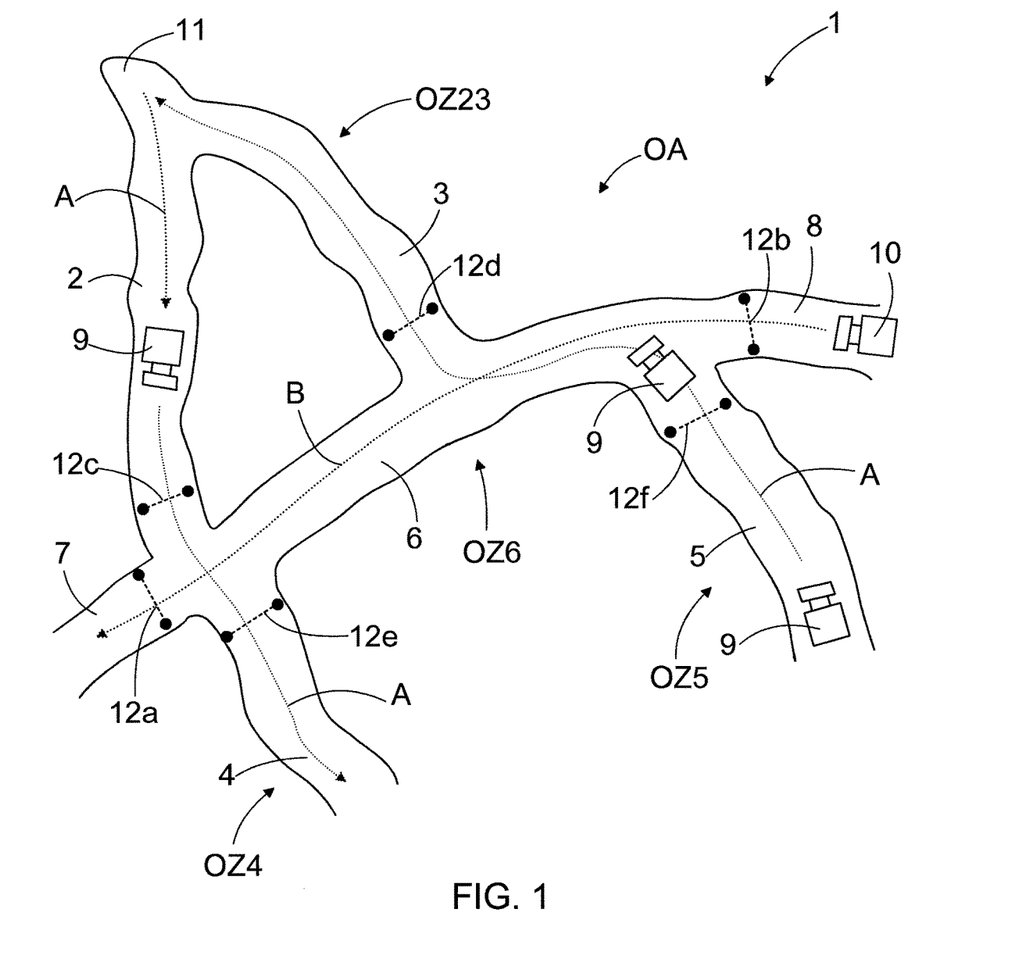
FIG. 1 shows schematically a part of a mine provided with a system for zone passage control.

In FIG. 1 it is schematically shown a part of a mine 1 provided with a system 13 for zone passage control. The mine 1 comprises a plurality of tunnels, i.e. tunnels 2, 3, 4, 5, 6, 7 and 8, which in the example of FIG. 1 form an operation area in the mine 1, wherein a plurality of mining vehicles, such as mining vehicles 9, 10 in the example of FIG. 1, or human beings being at work in the mine, may operate. The mining vehicle may be generally any of the following types: an automated mining vehicle, which in its normal operating mode operates autonomously without any external control but which may be taken under external control during states of emergencies or loading, for example, or an unmanned mining vehicle which is remotely controllable from a remote control room, which may also be at least partly autonomously operating mining vehicle, or a manned mining vehicle, which is operated by an operator sitting in a cabin of the mining vehicle. In the example presented, it is assumed that the mining vehicles 9 are automated mining vehicles and the mining vehicle 10 is a manned mining vehicle.

In FIG. 1 the tunnels 2, 3 are united at their farther ends so as to form a dump point 11 or an emptying point 11 for blasted rock and the tunnel 6 provides a passage between the tunnels 2, 3, 4, 5, 7 and 8. In the example of FIG. 1 it is assumed that the tunnels 2, 3, 4, 5, and 6 provide an operation area OA originally intended for the operation of the automated mining vehicles 9 only. The operation area OA is divided into a number of operation zones, which may also be called as safety zones, for the automated mining vehicles 9, i.e. an operation zone OZ23 including the tunnels 2 and 3, an operation zone OZ4 including the tunnel 4, an operation zone OZ5 including the tunnel 5 and an operation zone OZ6 including the tunnel 6. The assumed route determined for the automated mining vehicles 9 in the example of FIG. 1 is determined to be from the tunnel 5 to the dump point 11 at the end of the tunnel 3 through the tunnels 3 and 6, and then back from the dump point 11 to the tunnel 4 through the tunnels 2 and 6, as shown schematically with arrows A drawn with dotted lines. The tunnels 7 and 8, in turn, are reserved for the operation of manned mining vehicles 10 only. Occasionally, however, there may appear a need for the manned mining vehicle 10 to access from the tunnel 8 to the tunnel 7, as disclosed schematically with an arrow B, or vice versa, through the tunnel 6, or to the dump point 11 and away from there through the tunnels 2, 3 and 6, i.e. through the operation zones OZ23 and OZ6 reserved for the operation of the automated mining vehicles 10.

In the following specification a reference sign OZ may also be used as a general reference sign for the operation zones OZ23, OZ4, OZ5 and OZ6 unless a particular operation zone OZ23, OZ4, OZ5 and OZ6 is referred to.

The access of mobile objects, such as the mining vehicles 9, 10 or human beings being at work in the mine 1 into the operation zones OZ are controlled by a system 13 for a zone passage control, i.e. a zone passage control system 13, which provides a safety system for respective operation zone(s). An exemplary embodiment of a system 13 for zone passage control is disclosed in FIG. 2. Accesses to tunnels 2, 3, 4, 5, 6, 7 and 8 and exits therefrom are provided through checkpoints, referred to with reference signs 12a, 12b, 12c, 12d, 12e, 12f, arranged at entrances of the tunnels. In the following specification a reference sign 12 may also be used as a general reference sign for the checkpoints 12a, 12b, 12c, 12d, 12e, 12f unless a particular checkpoint 12a, 12b, 12c, 12d, 12e, 12f is referred to. At the checkpoints 12 there are arranged functional units that are part of the system 13 for the zone passage control.

Figure 2:
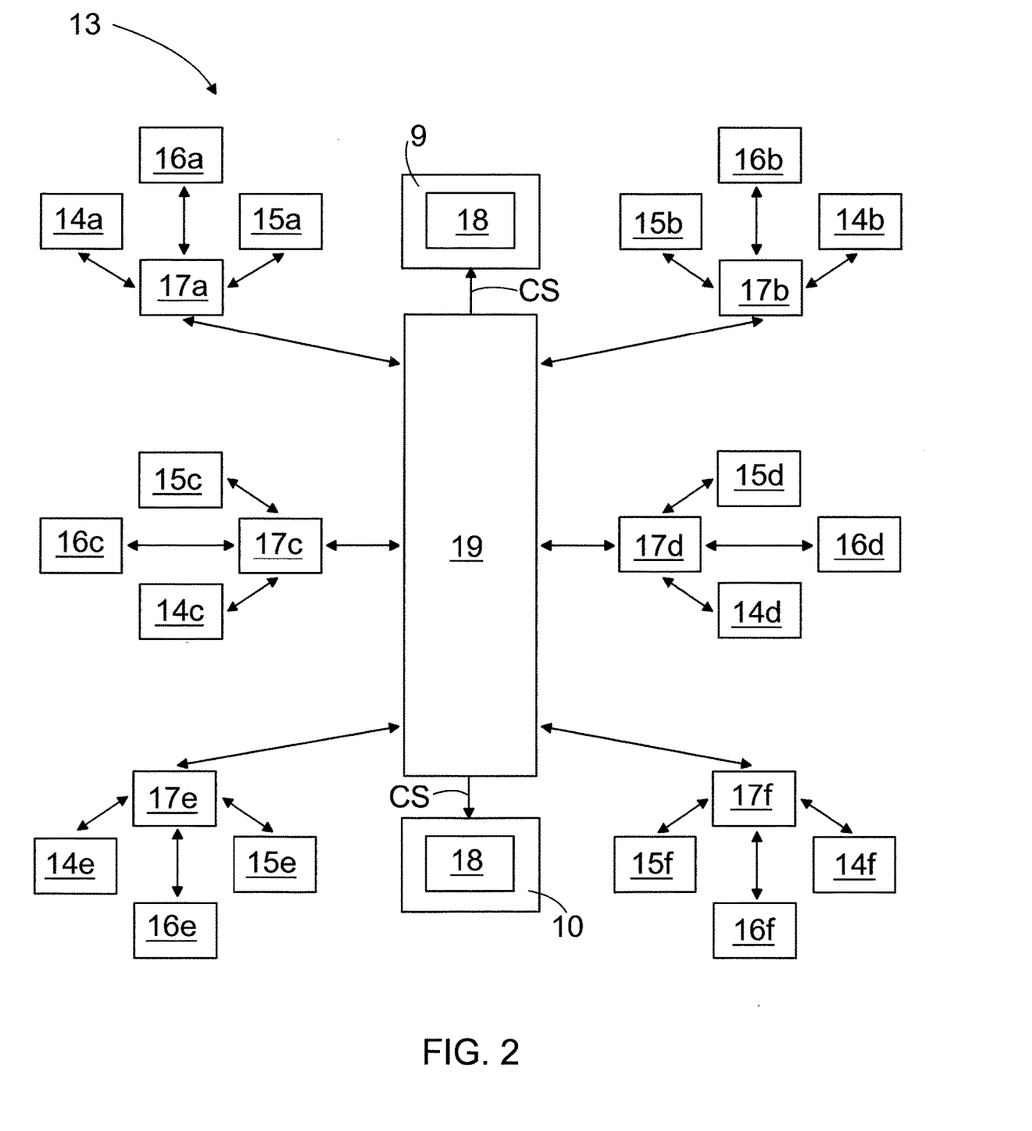
FIG. 2 shows schematically a system for zone passage control.

FIG. 2 shows schematically a system 13 for a zone passage control. The system 13 comprises a number of different types of functional units and a central controller 19 being arranged in operational connection with the functional units. For example, the central controller 19 may be arranged at a remote control room, but it is to be appreciated that the controller can be positioned in many different ways. At first it is discussed different types of devices belonging to a system 13 for the zone passage control and the actual operation of the system 13 is discussed thereafter.

The system 13 for the zone passage control may comprise detection units 14a, 14b, 14c, 14d, 14e, 14f. In the following specification a reference sign 14 may also be used as a general reference sign for the detection units 14a, 14b, 14c, 14d, 14e, 14f unless a particular detection unit 14a, 14b, 14c, 14d, 14e, 14f is referred to. The detection units 14 form a type of a functional unit in the system 13 for the zone passage control. All the detection units 14 available in the system 13 for the zone passage control provide a set of the detection units 14.

The detection unit 14 may be placed at the checkpoint 12 and it is able to detect the mobile object and its direction of motion. The detection units 14 detect a mobile object, such as a mobile mining vehicle or a human being, entering into the operation zone OZ and/or exiting the operation zone OZ.

With the feature that the mobile object is entering into the operation zone OZ, it may be meant at least one of the following events: a) the mobile object is moving and intending to enter into the operation zone OZ; b) the mobile object holds still and is waiting to enter into the operation zone OZ; c) the mobile object has actually entered into the operation zone OZ.

With the feature that the mobile object is exiting from the operation zone OZ, it may be meant at least one of the following events: d) the mobile object is moving and intending to exit from the operation zone OZ; e) the mobile object holds still and is waiting to exit from the operation zone OZ; f) the mobile object has actually exited from the operation zone OZ.

When the detection unit 14 has detected at least one of the above mentioned events, the detection unit 14 provides a corresponding signal to the central controller 19.

The detection unit 14 may be an optoelectronic guard detector, such as a guard detector based on the use a light curtain or photocells. Alternatively other kind of devices such as laser scanning devices and safety mats, for instance, or any other applicable device to detect a presence of the mobile object and its direction of motion may be applied.

The system 13 for the zone passage control may further comprise identification units 15a, 15b, 15c, 15d, 15e, 15f. In the following specification a reference sign 15 may also be used as a general reference sign for the identification units 15a, 15b, 15c, 15d, 15e, 15f unless a particular identification unit 15a, 15b, 15c, 15d, 15e, 15f is referred to. The identification units 15 form a type of a functional unit in the system 13 for zone passage control. All the identification units 15 available in the system 13 for the zone passage control provide a set of the identification units 15.

The identification unit 15 may be placed at the checkpoint 12 and it is able to identify the mobile object entering or exiting the zone, as described above. The identification of the mobile objects includes at least the identification of the type of the mobile object, i.e. if the mobile object is an automated mining vehicle, an unmanned remotely controllable mining vehicle or a manned mining vehicle, or a human being, for example. The identification of the mobile object may also include also the identification of a particular vehicle entity or a particular human being. When the identification unit 15 has identified the mobile object, the identification unit 15 provides a corresponding signal to the central controller 19.

The identification unit 15 may for example be a reader device or a camera, by which it can be read an identification element 18 comprised by the mobile object. According to an embodiment the identification unit 15 may be a RFID scanner being able to read a RFID tag in the mobile object, the RFID tag thus providing a kind of an identification element 18 comprised by the mobile object. The identification unit 15 may also be a device which is able to identify the mobile object without any counterpart identification element 18 in the mobile object. The identification unit 15 may for example be a device that provides a connection with a control unit of the mining vehicle and receives an identifier from the mining vehicle via a wireless local area network, for example. The identification element 18 may also provide a type of a functional unit in the system 13 for the zone passage control.

If that is applicable, the operations provided by the detection unit 14 and the identification unit 15 may also be combined in one single unit.

Furthermore the system 13 for the zone passage control may comprise indication units 16a, 16b, 16c, 16d, 16e, 16f. In the following specification a reference sign 16 may also be used as a general reference sign for the indication units 16a, 16b, 16c, 16d, 16e, 16f unless a particular indication unit 16a, 16b, 16c, 16d, 16e, 16f is referred to. The indication units 16 form a type of a functional unit in the system 13 for zone passage control. All the indication units 16 available in the system 13 for the zone passage control provide a set of the indication units 16.

The indication unit 16 may be placed at the checkpoint 12 and it is able to indicate an admissibility level for the mobile object to enter into the operation zone OZ and/or exit away from the operation zone OZ. In its simplest form the admissibility level may comprise two options or states, i.e. a negative state indicating that the mobile object is not allowed to enter into the operation zone OZ or exit away from the operation zone OZ, and a positive state indicating that the mobile object is allowed to enter into the operation zone OZ or exit away from the operation zone OZ. Instead of or in addition to that the admissibility level may also indicate order or turn of the mobile object to enter into the operation zone OZ or to exit away from the operation zone OZ.

In case of a manned mining vehicle or a human being, the indication unit 16 may be provided by traffic lights arranged at the checkpoint 12 or indicator lights arranged in a dashboard of the mining vehicle, for example. In case of an unmanned remotely controllable mining vehicle the indication unit 16 may be indicator lights arranged in a user interface of the operator of the vehicle. In case of an automated mining vehicle the indication unit 16 may be a data record unit in a control unit of the mining vehicle, the state of which data record unit is changed on the basis of the admissibility level determined for the particular mining vehicle.

The system 13 for the zone passage control may further comprise a tracking & visualization sub-system, at a mining vehicle 9,10, a remote control site, and/or at one or more positions in the work site. This sub-system may provide online map visualization of the locations and/or status vehicles and other traffic within different zones or segments.

Depending on the embodiment the system 13 for the zone passage control may comprise only some types of the functional units disclosed above, such as the detection units 14 and the identification units 15. Preferably, however, the system 13 for the zone passage control comprises all types of the functional units disclosed above. In addition to the functional units mentioned above the system 13 for the zone passage control may comprise some additional functional units too.

In addition to the functional units disclosed above, the system 13 for the zone passage control may comprise transceiver units 17a, 17b, 17c, 17d, 17e, 17f. In the following specification a reference sign 17 may also be used as a general reference sign for the transceiver units 17a, 17b, 17c, 17d, 17e, 17f unless a particular transceiver unit 17a, 17b, 17c, 17d, 17e, 17f is referred to.

The transceiver units 17 provide a communication link between the functional units disclosed above and the central controller 19. Depending on the intended operation of the functional unit the communication link may be established as unidirectional or bidirectional communication link. In the example of FIG. 2 it is provided one transceiver unit 17 entitled to each group comprising a single detection unit 14, a single identification unit 15 and a single indication unit 16. However, if applicable, a single transceiver unit 17 may also be reserved to serve the communication between the central controller 19 and several detection units 14, several identification units 15 and several indication units 16. All the transceiver units 17 available in the system 13 for the zone passage control provide a set of the transceiver units 17.

Any transceiver unit 17 may also be left out if the respective functional units, i.e. detection units 14, identification units 15 and indication units 16 already comprise an internal transceiver unit. Furthermore, the central controller 19 may bypass any of the transceiver units 17 and provide a straight communication link with any detection unit 14, any identification unit 15 and any indication unit 16 if applicable.

As stated already above, the system 13 for the zone passage control comprises the central controller 19, which is arranged in operational connection with the set of the detection units 14, with the set of the identification unit 15 and with the set of the indication units 16. In the example of FIGS. 1 and 2, the central controller 19 is able to control all the operation zones OZ23, OZ4, OZ5 and OZ6 reserved for the operation of the autonomously operating mobile objects through the detection units 14, the identification units 15 and the indication units 16. Alternatively the central controller 19 may be configured to control only a single operation zone.

According to an embodiment, the central controller 19 is configured to determine a state of the zone OZ on the basis of data supplied by at least one of the set of the detection units 14 and the set of the identification units 15. The state of the zone OZ may for example comprise data about at least one of a number and a type of mobile objects existing in the zone OZ and a number and a type of mobile objects entering or exiting the zone OZ.

Further, the central controller 19 is configured to determine, on the basis of the determined state of the zone OZ, an admissibility level AL for a mobile object to enter the zone OZ. The admissibility level for the mobile object defines whether the mobile object intending to enter the zone OZ or actually already entered the zone OZ is allowed to enter the zone OZ.

The central controller 19 is also configured to determine, on the basis of the determined state of the zone OZ, an admissibility level AL for a mobile object to exit the zone OZ. In this case the admissibility level for the mobile object defines whether the mobile object intending to exit the zone OZ or actually already exited the zone OZ is allowed to exit the zone OZ.

The admissibility level for the mobile object to enter the zone OZ and/or exit the zone OZ is set to be positive, if it is determined on the basis of the determined state of the zone that the mobile object is allowed to enter and/or exit the zone OZ. The admissibility level for the mobile object to enter the zone OZ and/or exit the zone OZ is set to be negative, if it is determined on the basis of the determined state of the zone that the mobile object is not allowed to enter and/or exit the zone OZ.

Furthermore, the central controller 19 is configured to provide, on the basis of the determined admissibility level, a control signal CS to stop at least one autonomously operating mobile object existing in the zone OZ in response to the determined admissibility level AL being negative for the mobile object entered the zone OZ.

Figure 3:
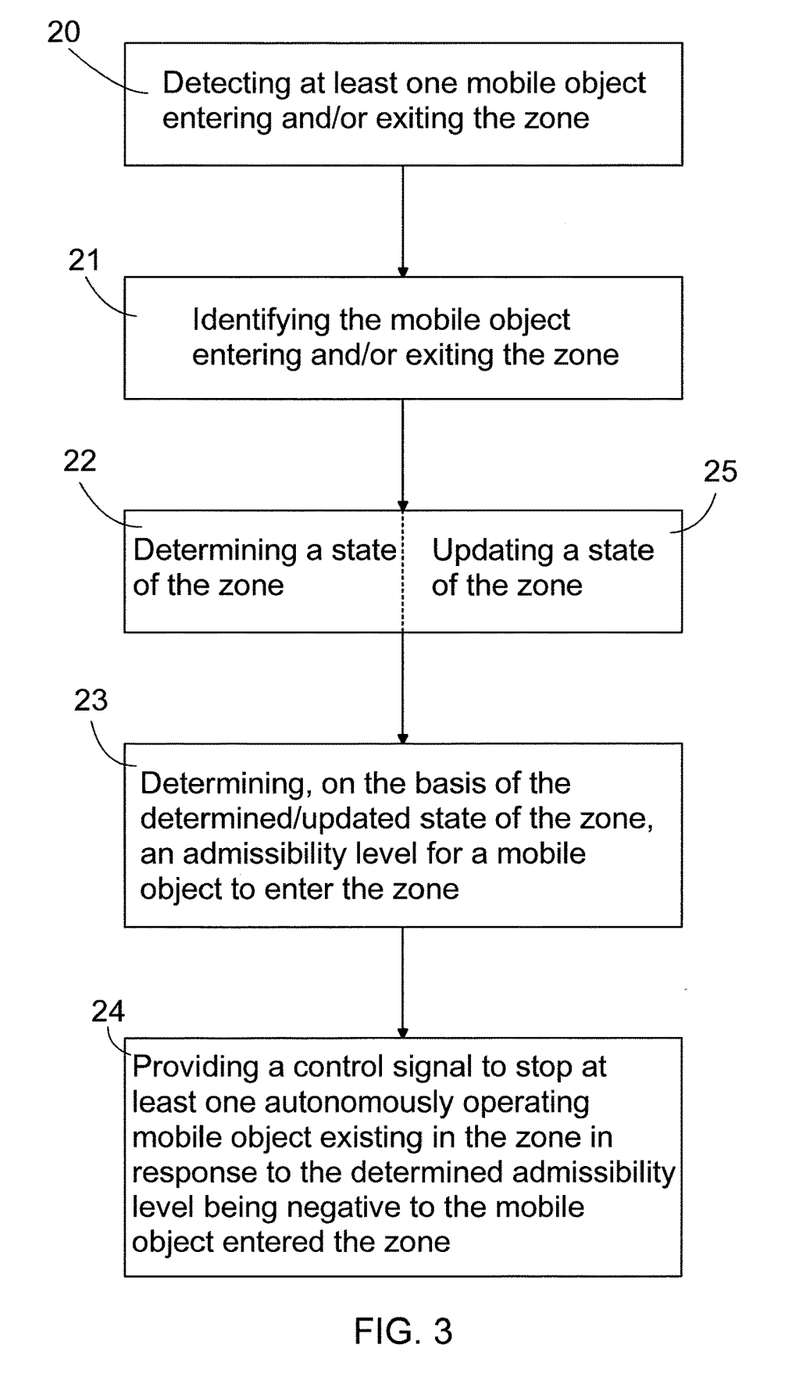
FIG. 3 shows schematically a method for zone passage control.

The method for zone passage control according to the embodiment disclosed above is schematically shown in FIG. 3. The method steps presented may be executed in any appropriate order, meaning that the order of the method steps may deviate from that disclosed in FIG. 3 depending on the state of the zone OZ.

In the method step referred to with reference sign 20 at least one mobile object entering and/or exiting the zone OZ is detected. In the following method step referred to with reference sign 21 the mobile object entering and/or exiting the zone OZ is identified. After that, as shown in the method step referred to with reference sign 22, the state of the zone OZ is determined on the basis of data provided by at least one of detecting at least one mobile object entering and/or exiting the zone OZ and of identifying the mobile object entering and/or exiting the zone OZ. On the basis of the determined state of the zone OZ it is determined an admissibility level for a mobile object to enter the zone, as schematically shown in the method step referred to with reference sign 23. In the method step referred to with reference sign 24, a control signal to stop at least one autonomously operating mobile object existing in the zone is provided in response to the determined admissibility level being negative for the mobile object entered the zone.

FIG. 3 shows schematically only one example of the method. The order of the method steps may vary from that disclosed in FIG. 3 if convenient to a specific embodiment.

When referring to the example of FIG. 1, the states of the operation zones OZ23, OZ4 and OZ6 indicate that there is one automated mining vehicle 9 in each of those zones. When it is determined that automated mining vehicles 9 and manned mining vehicles 10 are not allowed to operation in the same zone at the same time, at least the automated mining vehicle 9 in the zone OZ6 is stopped, but possibly also the automated mining vehicles 9 in the zones OZ23 and OZ5 are stopped in response to the event that the manned mining vehicle 10 enters to the operation zone OZ6, as detected and identified by the detection unit 14b and the identification unit 15b at the checkpoint 12, despite of the admissibility level AL being determined negative for the manned mining vehicle 10 to enter to the operation zone OZ6. In that case any risk of collision between any automated mining vehicle 9 and the manned mining vehicle 10 is avoided.

According to an embodiment, the central controller 19 is further configured to update the state of the zone OZ on the basis of data supplied by at least one of the set of the detection units 14 and the set of the identification units 15 in response to a mobile object being detected to enter or exit the zone OZ, and to determine, on the basis of the updated state of the zone, the admissibility level for a mobile object to enter the zone. This means that the state of the zone OZ is updated in response to at least one of the set of the detection units 14 and the set of the identification units 15 informing at least one of the following events:

a) the mobile object is moving and intending to enter into the operation zone OZ;
b) the mobile object holds still and is waiting to enter into the operation zone OZ;
c) the mobile object has actually entered into the operation zone OZ;
d) the mobile object is moving and intending to exit from the operation zone OZ;
e) the mobile object holds still and is waiting to exit from the operation zone OZ;
f) the mobile object has actually exited from the operation zone OZ.

In FIG. 3 the method step referred to with reference sign 25 schematically shows the updating of the state of the zone OZ and the method step referred to also with reference sign 23 schematically shows the determination of the admissibility level for a mobile object to enter the zone on the basis of the updated state of the zone.

In the execution of the method steps it is applied, when applicable, a computer program product that comprises computer program code means configured to execute the steps of the method when being run on a central controller 19, which is provided by a computer or a device similar to that.

When again referring to the example of FIG. 1, the detection unit 14b and the identification unit 15b detect and identify that the manned mining vehicle 9 either is moving and intending to enter into the operation zone OZ6 or that the manned mining vehicle 9 holds still and is waiting to enter into the operation zone OZ6. In response to the information provided by the detection unit 14b and the identification unit 15b the central controller 19 updates the at least the state of the operation zone OZ6 but possibly also the states of the operation zones OZ23 and OZ5, whereby the states of the operation zones OZ23, OZ4 and OZ6 indicate that there is one automated mining vehicle 9 in each of those zones. Because there is at least one automated mining vehicle 9 in the operation zone OZ6, the admissibility level AL for the manned mining vehicle 10 is determined to be negative, which is informed to the operator of the manned mining vehicle 10 with the indication unit 16b.

However, if the manned mining vehicle 10 enters to the operation zone OZ6 although the admissibility level to enter the zone OZ6 is set to be negative, at least the automated mining vehicle 9 in the zone OZ6 is stopped, but possibly also the automated mining vehicles 9 in the zones OZ23 and OZ5 are stopped, by a control signal provided by the central controller 19.

According to an embodiment the central controller 19 is configured to determine the admissibility level AL for any mobile object entering the zone to be negative in response to at least one autonomously operating mobile object existing in the zone. When referring to the example of FIG. 1 this means for example that only one automated mining vehicle 9 is allowed to exist in any of the zones OZ23, OZ4, OZ5 and OZ6 at a time and no more automated mining vehicles 9 or other mobile objects are allowed to be at the same operation zone at the same time.

According to an embodiment the central controller 19 is configured to determine the admissibility level AL for an autonomously operating mobile object entering the zone OZ to be negative in response to at least one non-autonomously operating mobile object existing in the zone OZ. When referring to the example of FIG. 1 this means for example that if the manned mining vehicle 10 is for example in the operation zone OZ6, the automated mining vehicles 9 in the operation zones AZ23 and AZ5 are not allowed to exit from the respective zones and enter to the operation zone OZ6, which is indicated to the automated mining vehicles 9 by the indication units 16c and 16f.

According to an embodiment the central controller 19 is configured to determine the admissibility level for an autonomously operating mobile object entering the zone to be positive in response to at least one autonomously operating mobile object existing in the zone. When referring to the example of FIG. 1 this means for example that the automated mining vehicle 9 being in FIG. 1 in the operation zone OZ6 may enter to the operation zone OZ23 through the checkpoint 12d at the entrance of the tunnel 3 although there already exists one automated mining vehicle 9 in the same operation zone in the tunnel 2. This is allowed for example in operation zones intended only for one-way traffic. In another embodiment, there may be provided passing bays or other means to allow two-way traffic for two or more vehicles within a zone.

According to an embodiment the central controller 19 is configured to determine the admissibility level AL for an autonomously operating mobile object entering the zone to be positive in response to no mobile object existing in the zone. When referring to the example of FIG. 1 this means for example that the automated mining vehicle 9 being in FIG. 1 in the operation zone OZ5 may enter to the operation zone OZ6 through the checkpoint 12f at the exit of the tunnel 5 if the automated mining vehicle 9 being in FIG. 1 in the operation zone OZ6 has already passed out of the operation zone OZ6 to the tunnel 3 through the checkpoint 12d. In this embodiment the autonomously operating mobile object has always a right of way over the non-autonomously operating mobile objects to enter into the operation zone wherein no other mobile objects exist, and the non-autonomously operating mobile objects, including human beings, must wait until they are allowed to enter the operation zone.

According to an embodiment the central controller 19 is configured to determine the admissibility level for a non-autonomously operating mobile object entering the zone to be positive in response to any autonomously mobile object not existing in the zone. When referring to the example of FIG. 1 this means for example that when the automated mining vehicle 9 being in FIG. 1 in the operation zone OZ6 has exited the operation zone OZ6, the manned mining vehicle 10 is allowed enter the operation zone OZ6 through the checkpoint 12f, which is indicated to the operator of the manned mining vehicle 10 with the indication unit 16b.

According to an embodiment the central controller 19 is configured to determine the admissibility level for a non-autonomously operating mobile object entering the zone to be negative in response to any autonomously mobile object existing in the zone. When referring to the example of FIG. 1 this means for example that the manned mining vehicle 10 is not allowed to enter the operation zones OZ23, and OZ5 and OZ6 because there are automated mining vehicles 9 in those operation zones. In other words, the entering of the manned mining vehicle 10 to these operating zones may be allowed as long as there are no automated mining vehicles 9 in those operation zones.

According to an embodiment the central controller 19 is configured to determine the admissibility level for a non-autonomously operating mobile object entering the zone to be negative in response to any mobile object existing in the zone. When referring to the example of FIG. 1 this means for example that the manned mining vehicle 10 is not allowed to enter the operation zone OZ23, OZ4, OZ5, OZ6 if any kind of mobile object, like automated mining vehicle 9, the manned mining vehicle 10 or a human being, is already present in that zone.

According to an embodiment the central controller 19 is configured to provide a control signal to stop at least one autonomously operating mobile object existing in the zone in response to the non-identification of the mobile object entered the zone. According to this embodiment at least one autonomously operating mobile object, but preferably all autonomously operating mobile objects as well as all non-autonomously operating mobile objects are stopped in response to an event that a mobile object the identification of which has not succeeded proceeds to the operation zone.

The system 13 for the zone passage control as presented above is able to control the access of the mobile objects entering the operation zone in such a way that also other mobile objects than only autonomously operating mobile objects are allowed to enter in a controlled manner to the same operation zone. Furthermore, the system also provides a safety precaution according to which the movement of at least one autonomously operating mobile object existing in the particular operation zone is stopped in response to an event that another object, which is not allowed to enter the same zone at the same time as there is at least one autonomously operating mobile object, has yet entered the same zone.

Figure 4:
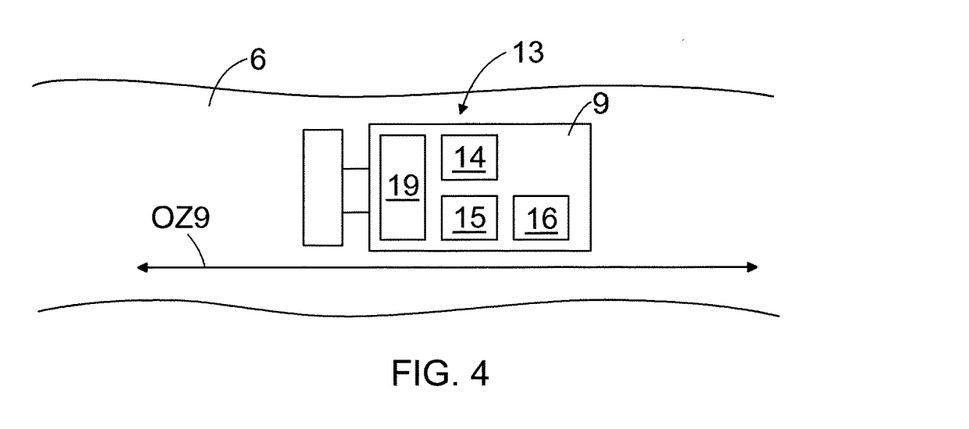
FIG. 4 shows schematically a system for zone passage control as being arranged in an autonomously operating mobile object.

FIG. 4 shows schematically a system 13 for zone passage control as being arranged in an autonomously operating mobile object, i.e. in the automated mining vehicle 9. The automated mining vehicle 9 comprises at least the detection unit 14 and the identification unit 15 and the central controller 19, the central controller 19 being arranged in operational connection with the detection unit 14 and the identification unit 15. The detection unit 14 and the identification unit 15 are selected in such a manner their operational range extends to some distance in the front of the automated mining vehicle 9 and behind the automated mining vehicle 9. The system 13 provides thereby an operation zone OZ9, or a safety zone OZ9, around the automated mining vehicle 9, which operation zone OZ9 moves with the automated mining vehicle 9 and prevents the automated mining vehicle 9 to advance too close to the other mobile objects and/or prevents any other mobile object to advance too close to the automated mining vehicle 9 according to predetermined practices like those presented above.

It will be obvious to a person skilled in the art that, as the technology advances, the inventive concept can be implemented in various ways. The invention and its embodiments are not limited to the examples described above but may vary within the scope of the claims.

The invention claimed is:

1. A system for zone passage control for a zone of an autonomously operating mobile vehicle in a worksite divided into a plurality of operation zones by checkpoints, the system comprising:

a set of checkpoints between the plurality of operation zones, wherein access and exit to each operation zone is provided through the checkpoints;

a set of detection units, each detection unit being placed at a checkpoint and being arranged to detect at least one mobile object entering and/or exiting the zone;

a set of identification units, each identification unit being placed at a checkpoint and being arranged to identify the mobile object entering and/or exiting the zone; and a central controller arranged in operational connection with the set of the detection units and with the set of the identification units, wherein the central controller is configured to determine a state of the zone on the basis of data supplied by at least one of the set of the detection units and the set of the identification units, the state of the zone including data about at least one of a number and a type of mobile objects existing in the zone and a number and a type of mobile objects entering or exiting the zone, to determine, on the basis of the determined state of the zone, an admissibility level for a mobile object to enter the zone, wherein the admissibility level for the mobile object to enter the zone is set to be positive if it is determined on the basis of the determined state of the zone that the mobile object is allowed to enter the zone or the admissibility level for the mobile object to enter the zone is set to be negative if it is determined on the basis of the determined state of the zone that the mobile object is not allowed to enter the zone, and to provide, on the basis of the determined admissibility level, a control signal to stop at least one autonomously operating mobile vehicle existing in the zone in response to the determined admissibility level being negative for the mobile object entered the zone.

2. The system as claimed in claim 1, wherein the central controller is further configured to update the state of the zone on the basis of data supplied by at least one of the set of the detection units and the set of the identification units in response to a mobile object being detected to enter or exit the zone, and to determine, on the basis of the updated state of the zone, the admissibility level for a mobile object to enter the zone.

3. The system as claimed in claim 1, wherein the central controller is further configured to determine, on the basis of the state of the zone, an admissibility level for a mobile object to exit the zone.

4. The system as claimed in claim 1, further comprising a set of indication units to indicate admissibility level for the mobile object to enter and/or exit the zone, the set of the indication units being arranged in operational connection with the central controller.

5. The system as claimed in claim 1, wherein the central controller is configured to determine the admissibility level for any mobile object entering the zone to be negative in response to at least one autonomously operating mobile vehicle existing in the zone.

6. The system as claimed in claim 1, wherein a non-autonomously operating mobile object is at least one of an unmanned remotely controllable mobile work machine, a manned mobile work machine and a human being.

7. An autonomously operating mobile vehicle including a system for a zone passage control of an autonomously operating mobile vehicle in a worksite divided into a plurality of operation zones by checkpoints, the system comprising:

a set of checkpoints between the plurality of operation zones, wherein access and exit to each operation zone is provided through the checkpoints;

a set of detection units, each detection unit being placed at a checkpoint and being arranged to detect at least one mobile object entering and/or exiting the zone;

a set of identification units, each identification unit being placed at a checkpoint and being arranged to identify the mobile object entering and/or exiting the zone; and a central controller arranged in operational connection with the set of the detection units and with the set of the identification units, wherein the central controller is configured to determine a state of the zone on the basis of data supplied by at least one of the set of the detection units and the set of the identification units, the state of the zone including data about at least one of a number and a type of mobile objects existing in the zone and a number and a type of mobile objects entering or exiting the zone, to determine, on the basis of the determined state of the zone, an admissibility level for a mobile object to enter the zone, wherein the admissibility level for the mobile object to enter the zone is set to be positive if it is determined on the basis of the determined state of the zone that the mobile object is allowed to enter the zone or the admissibility level for the mobile object to enter the zone is set to be negative if it is determined on the basis of the determined state of the zone that the mobile object is not allowed to enter the zone, and to provide, on the basis of the determined admissibility level, a control signal to stop at least one autonomously operating mobile vehicle existing in the zone in response to the determined admissibility level being negative for the mobile object entered the zone.

8. A method for zone passage control for a zone of an autonomously operating mobile vehicle in a worksite divided into a plurality of operation zones by checkpoints, the method comprising:

detecting, at a checkpoint, at least one mobile object entering and/or exiting the zone;

identifying, at a checkpoint, the mobile object entering and/or exiting the zone;

determining a state of the zone on the basis of data provided by at least one mobile object detected entering and/or exiting the zone and of the identified mobile object entering and/or exiting the zone, the state of the zone including data about at least one of a number and a type of mobile objects existing in the zone and a number and a type of mobile objects entering or exiting the zone;

determining, on the basis of the determined state of the zone, an admissibility level for a mobile object to enter the zone, wherein the admissibility level for the mobile object to enter the zone is set to be positive if it is determined on the basis of the determined state of the zone that the mobile object is allowed to enter the zone or the admissibility level for the mobile object to enter the zone is set to be negative if it is determined on the basis of the determined state of the zone that the mobile object is not allowed to enter the zone; and providing, on the basis of the determined admissibility level, a control signal to stop at least one autonomously operating mobile vehicle existing in the zone in response to the determined admissibility level being negative for the mobile object entered the zone.

9. The method as claimed in claim 8, further comprising updating the state of the zone on the basis of data provided by at least one of the at least one mobile object detected entering and/or exiting the zone and of the mobile object identified entering and/or exiting the zone, and determining on the basis of the updated state of the zone, the admissibility level for a mobile object to enter the zone.

10. The method as claimed in claim 8, further comprising determining on the basis of the state of the zone the admissibility level for a mobile object to exit the zone.

11. The method as claimed in claim 8, further comprising indicating the admissibility level for the mobile object to enter and/or exit the zone.

12. The method as claimed in claim 8, wherein the admissibility level for any mobile object entering the zone is determined to be negative in response to at least one autonomously operating mobile vehicle existing in the zone.

13. The method as claimed in claim 8, wherein a non-autonomously operating mobile object is at least one of an unmanned remotely controllable mobile work machine, a manned mobile work machine and a human being.

14. A computer program product, comprising computer program code means configured to execute the steps of the method disclosed in claim 8 when being run on a computer.

* * * * *